Oct. 25, 1955     R. R. ALLEN ET AL     2,721,473

FABRIC TESTING MACHINE

Filed Feb. 5, 1951     6 Sheets-Sheet 1

Fig. 1.

INVENTORS
Robert R. Allen
Robert J. Novotny
BY
Benj. T. Rauber
ATTORNEY

INVENTORS
Robert R. Allen
Robert J. Novotny
BY
Benj. T. Rauber
ATTORNEY

Fig.15.

United States Patent Office 2,721,473
Patented Oct. 25, 1955

2,721,473

FABRIC TESTING MACHINE

Robert R. Allen, Endwell, N. Y., and Robert J. Novotny, Irvington, N. J., assignors to Custom Scientific Instruments, Inc., Arlington, N. J., a corporation of New Jersey Application February 5, 1951, Serial No. 209,340

16 Claims. (Cl. 73—7)

Our present invention relates to a wear testing machine for fabrics of various kinds.

In testing, fabrics are generally subjected to abrasion while held substantially flat, to abrasion while folded double, as in a hem, or while folded over a bar, and to flexing. Generally the test is conducted until the fabric wears through or fails, but in flat abrasion tests of coated materials and of thick materials, wear to a depth depending on the thickness or other qualities of the material gives a better or more informative test. It is of the greatest importance that the conditions be identical in all tests or be reproducible with exactness and certainty, and that the tests be as free as possible from dependence on the judgement of the operator.

Our present invention provides an apparatus in which the various tests mentioned above may be conducted under conditions which may be exactly and automatically reproduced and which may be adjusted to various requirements and conditions.

In our invention we provide a testing machine which may be adapted for abrasion tests either to complete break through or to a set depth, or for a flexing abrasion with an automatic stop when the end point is reached. The automatic stopping of the machine at the exact point of failure or at a point previously set, avoids the necessity for the operator to determine the stopping point and to stop the machine at this point. It also frees the machine from the requirement of attention during the test. Moreover the machine may be set to reproduce with certainty any given conditions of wear.

The stopping of the machine at the end point is electrically controlled. For a flat abrasion test, the fabric is placed on an inflated flexible dome of suitable material, such as rubber, having at its upper surface a metal terminal inset of an electrical circuit. This dome is carried on a base which is reciprocated horizontally by mechanism driven by an electric motor controlled by the circuit. The reciprocations are counted by a counting device and the base and dome are rotated slightly with each stroke. Immediately above this dome, is an abrasion head carried on a balanced lever and covered with a suitable strip of abrasive, such as emery cloth or emery paper, opposed to the specimen of fabric on the dome. The abrasion head also carries a contact terminal immediately above that of the flexible dome, the abrasive strip having a small opening so that contact may be made, closing the electric circuit to stop the motor when the fabric is worn through between the contacts. The dome is inflated by air supplied from a pump driven at constant speed and the pressure regulated by a controlled leak valve to provide a wear area of selected extent. The abrasion head may be weighted with a selected weight to provide a desired pressure on the fabric. The contact terminal in the dome is connected in the circuit by a spring contact sufficient to maintain contact under variations in the inflation of the dome without affecting the inflation.

When the apparatus is to be used for testing depth wear as in the case of thick coated fabrics or carpets or floor coverings, the arrangement is the same except that the circuit is closed between a branch having a contact terminal fixed with relation to the dome and a terminal movable with the abrasion head and spaced from the fixed terminal a distance corresponding to the depth of wear.

When the apparatus is to be used for the testing of a folded fabric the dome is replaced by a base having a clamp in which the fold of cloth is held either at its selvage, in a free fold, or folded over a bar and contact made as the edge of the fold is worn through. In testing for flexing wear, one end of the fabric specimen is gripped and held in a reciprocating base fitted with a gripping element then bent about a floating flexing bar and the other end gripped and held in the abrasion head. The flexing bar is connected through cables to a suspended weight so that when the fabric wears through and fails the weight drops to close the motor stopping circuit. The flexing bar is provided with a wear resistant insert, about which the fabric is bent, to avoid error through unequal wear.

The circuit controlling the stopping of the motor has branches, one closed through the dome and abrasion head terminals, one closed through the depth contacts, and one closed through the release of the flexing weight. A timer circuit controlling the motor is also provided to stop the motor at a selected time interval to determine the amount of wear in the selected interval by a clamping device which holds the cloth doubled or folded on itself or over a bar. Upon wearing of the fabric to failure, contact is made between the clamping element and the contact in the abrasion head.

For a flexing test the dome is replaced by a clamp in which is secured one end of a strip of fabric to be tested. The strip is then passed about a horizontal floating wearing bar and secured to the head. The wearing bar is held taut by a flexible cord suspended on pulleys and is moved back and forth as the end of the strip is reciprocated. When the strip wears through the weights drop and close a stop switch.

Various features of our invention are illustrated, by way of example, in the accompanying drawings in which.

Referring more particularly to Figs. 1 to 5 of the drawings, the various parts of the apparatus are illustrated as This page is largely illegible due to a wide black band obscuring the center of both columns. Only fragments at the edges of each column are visible, and reconstruction of the full text is not possible.

20. The other contact comprises a contact rod or stem 84 mounted vertically immediately above the contact 83 in a bracket 85 extending sidewise from the abrasion head and into which the rod 84 is threaded. This rod is adjustable vertically by means of a knob 86 to provide a gap between its lower end and the contact 83 when the abrasion head is lowered, which gap will be equal to the amount of wear to which the specimen is to be subjected during the test. The position of the rod 84 may be indicated by a suitable scale, not shown.

Except for the fact that the contact is made between the terminals 83 and 84, before the fabric is worn through, the testing is substantially the same as that described above.

In each test the dome will be rotated by the ratchet and pawl 32, 34. This ratchet may, however, be disconnected or released in case it is desired not to rotate the specimen.

Figure 6:
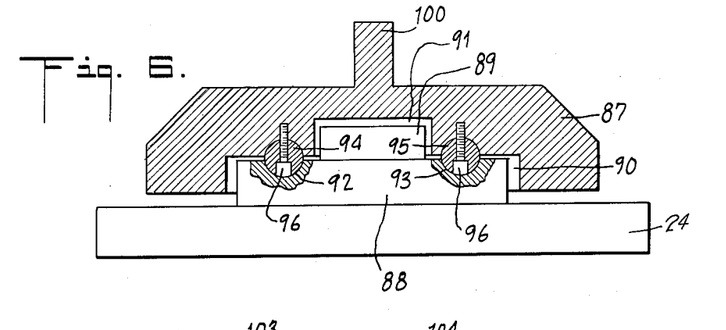
Fig. 6 is a vertical section of a modified form of the fabric supporting base.
Figure 7:
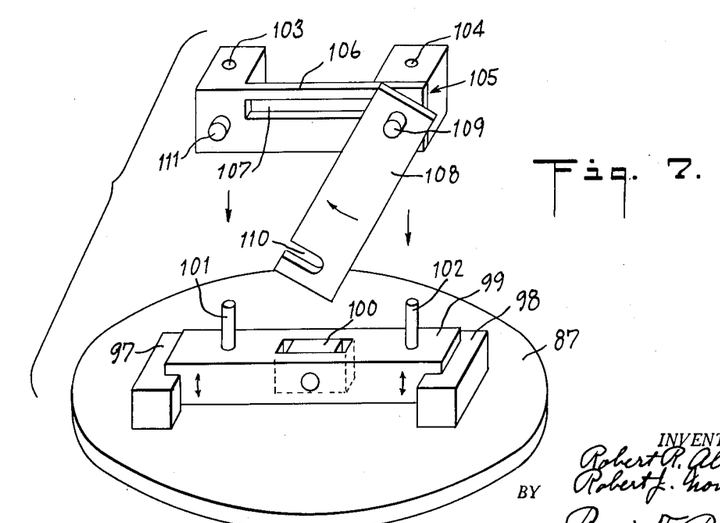
Fig. 7 is a perspective view of the fabric clamping elements for the head shown in Fig. 6.
Figures 8, 12:
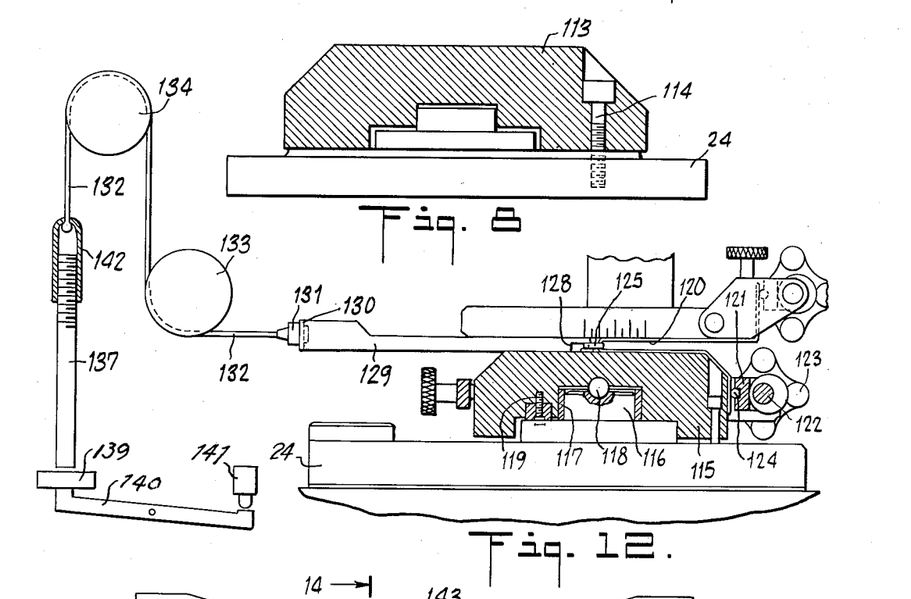
Fig. 8 is a similar vertical view of a still further modification of the fabric supporting base.
Fig. 12 is an elevation partly in section of the apparatus arranged for a flexing test.

When it is desired to test the wearing qualities or abrasion resistance of a selvage edge or of an edge formed by folding the fabric, the specimen plate 32 is replaced by a plate such as shown in Figs. 6 to 8.

In the form of the invention shown in Fig. 6, a specimen plate 87 is placed on the base 24. For this purpose this base has a raised platform 88 and an upstanding boss 89 which are received in recesses 90 and 91 of the specimen plate. A pair of cylindrical recesses 92 and 93 are formed in the upper surface of the platform 88 to receive cylinders 94 and 95 which are secured in the specimen plate by screws 96. This permits a self adjustment of the specimen plate on the base while at the same time serving to carry the specimen plate with the base as the latter reciprocates.

Figure 9:
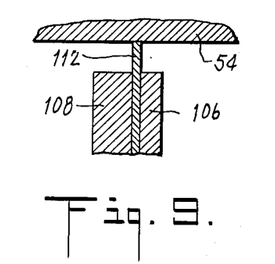
Figs. 9, 10 and 11 are sectional views of the base of Fig. 7 showing the placement therein of the fabric for testing the selvage, a doubled fabric and a fabric over a bar.

Mounted on the upper surface of the specimen plate 87 are a pair of vertical guides 97 and 98 having their opposed faces recessed to receive a transverse bar 99. This bar is pivotally pinned on a central upright 100 on the base so that it may rock slightly. The transverse bar 99 carries a pair of spaced vertical uprights 101 and 102 which are received in openings 103 and 104 of a fabric holding block 105. The block 105 may be readily removed and replaced for mounting a specimen of fabric to be tested. The block 105 is narrowed at its mid point to form a vertical plate 106 having a horizontal slot 107 at a short distance below its upper edge. A plate 108 is pivoted to the face of the block 105 by a pivot pin 109 and is provided with a notch 110 to receive a securing screw 111 when the plate 108 is swung upwardly to horizontal position. The selvage edge of a fabric 112 to be tested may be placed against the face of the connecting plate element 106 and project slightly thereabove, the plate 108 swung upwardly into position and tightened by the screws 109 and 111 to secure the fabric at its selvage edge as shown in Fig. 9. When the abrasion head 54 is brought downwardly onto the selvage edge as indicated in Fig. 9, the block and with it the fabric carrying block 105 will adjust themselves so that the selvage edge will contact the abrasion head uniformly throughout its length.

Upon reciprocation of the base 24 the selvage edge will be gradually abraded until the contact rod 78 in the abrasion head touches the block 105 thereby closing the circuit that stops the motor.

Figure 10:
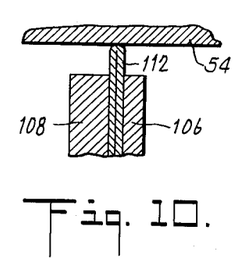
Figure 11:
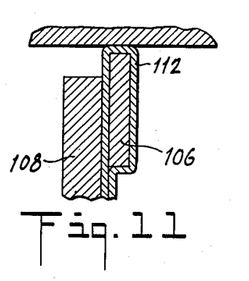

Similarly a folded edge may be tested by doubling the fabric on itself and clamping it as shown in Fig. 10. If the abrasion of a fold over a rigid part is desired, the fabric may be passed through the slot 107 then turned over the upper edge of the plate section 106 and brought downwardly back of the clamping bar 108 and clamped as shown in Fig. 11.

In the modification shown in Fig. 8 a fabric holding block 113 is mounted on the base 24 and secured thereon by means of a screw 114. This may be done with sufficient play to enable the block to adjust itself.

When a specimen is to be subjected to flexing abrasion, a fabric securing block as shown at 115 (Fig. 12) is mounted on the base 24. For this purpose the base is provided with a central vertical projection 116 to be received in a similar recess 117 in the block 115. The upper surface of the projection 116 and the bottom of the recess 117 are provided with opposed semi-cylindrical or semi-spherical hollows to receive a cylinder or ball 118 which permits a slight adjustment of the block 115 to the horizontal. The block may also be pinned to the base 24 by means of a pin 119 projecting upwardly from the base in a suitable recess in the block 115. One end of a fabric 120 is secured to the front face of the block 115 by means of a clamping bar 121 movable against the block 115 by means of an eccentric 122 rotatable by a hand wheel 123.

The bar 121 is provided with a rubber inset 124 to frictionally grip the end of the fabric strip. The strip is then carried rearwardly over the upper surface of the block 115 and about a flexing bar 125, as shown in Fig. 12, and then forwardly below the abrasion head to be secured between the front face thereof and the gripping bar 73.

The flexing bar 125 is provided with notches 126 and 127 near its ends (Fig. 13) into which are fitted the hooked recesses 128 of a pair of rods 129 extending forwardly from a cross-piece 130. This cross-piece is in turn secured by means of a releasable connector 131 to the end of a flexible cable 132 which passes below a pulley 133 thence over a supporting pulley 134 supported in a bracket 135 on a standard 136 extending upwardly from the base 20.

At the free end of the cable 132 is secured a counterweight 137 which draws the flexing bar against the fold of the fabric. As the base 24 reciprocates forwardly and back the fold or bight of the fabric moves backwardly and forwardly one-half the distance of the reciprocation and the flexing bar accordingly moves backwardly and forwardly being held taut against the fabric by the counterweight 137.

Figure 1:
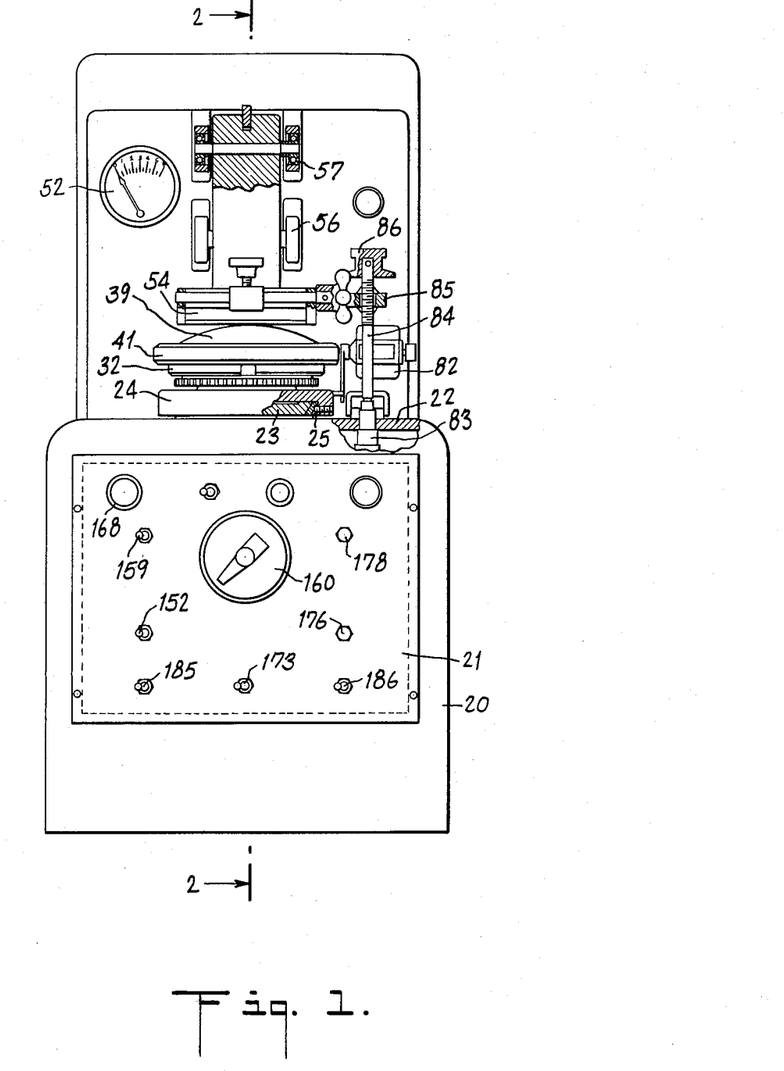
Fig. 1 is a front view of a machine embodying a preferred form of the invention.
Figure 2:
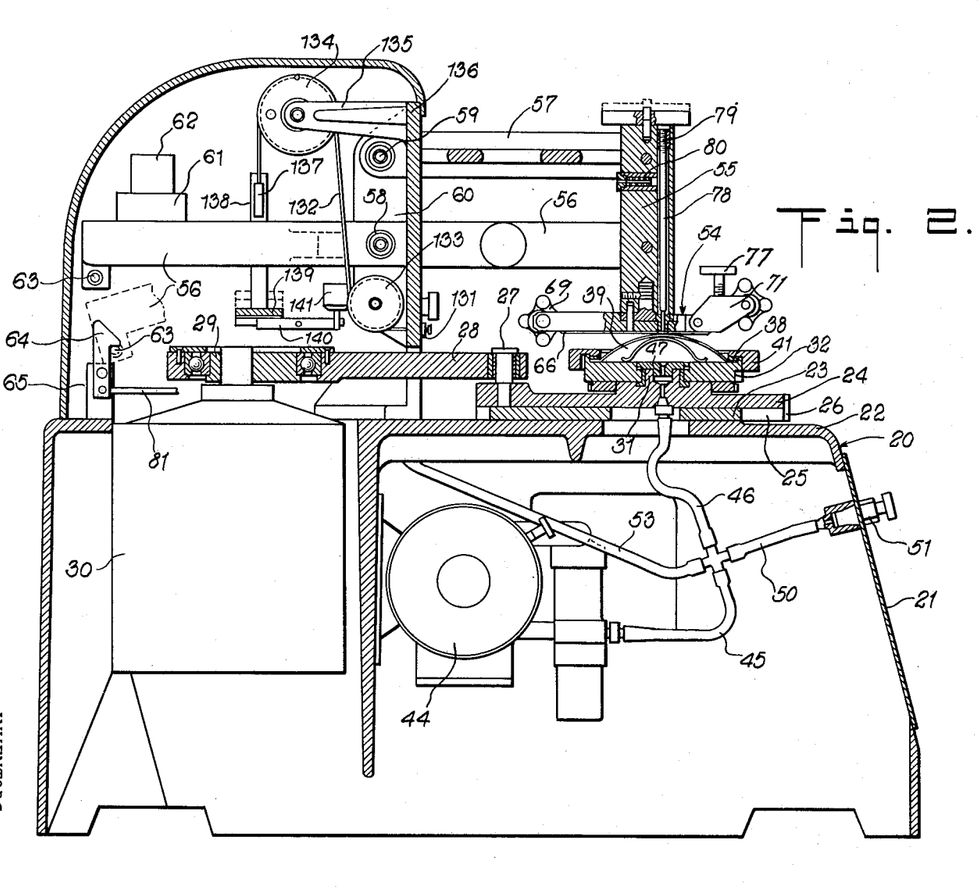
Fig. 2 is a vertical sectional view of the machine taken on line 2—2 of Fig. 1.
Figure 3:
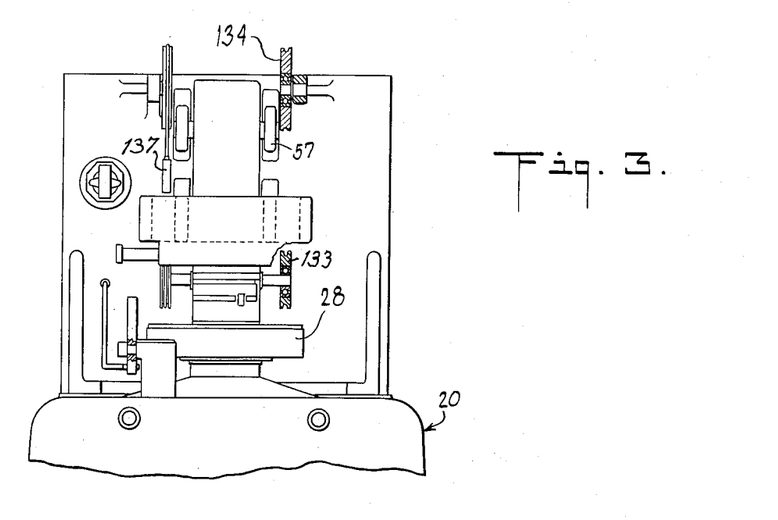
Fig. 3 is a rear elevation of the machine, certain parts of the casing being removed to illustrate the working elements.
Figure 4:
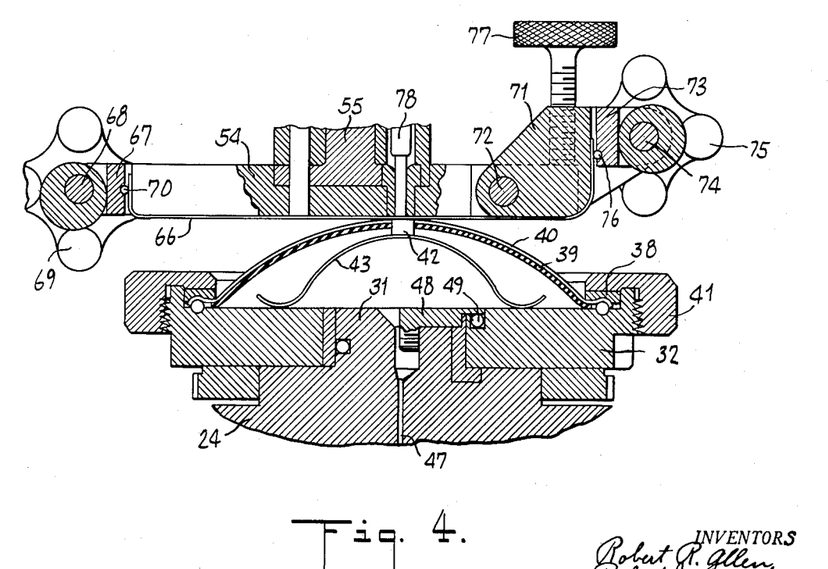
Fig. 4 is a detail view on a larger scale of a fabric supporting dome and abrasion head.
Figure 5:
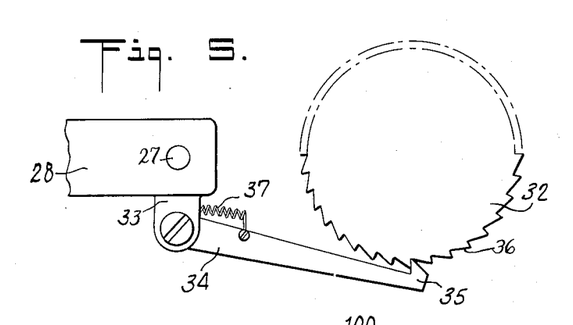
Fig. 5 is a plan view of a part of the apparatus showing a ratchet for rotating the fabric supporting base.

It will be understood that when the flexing bar is not used the connector 131 may be detached from the cross-piece 130 and be retained against the upright 136 as shown in Fig. 2.

As the base reciprocates, the counterweight 137 will rise and fall and the fabric will be bent about and abraded by the flexing bar until it is completely worn through. At this point the flexing bar and its supporting yoke 130 are released and are drawn backwardly to the standard 136 while the counterweight 137 falls through a guiding cylinder 138 to a platform 139 supported on one end of a lever 140 which is tilted counterclockwise and its forward end rises and closes a switch 141 (Fig. 2) to stop the motor. The number of cycles at which complete failure occurs may then be read from the counter.

Preferably the counterweight 137 is secured to the flexible cable 132 by an internally threaded cap 142 as shown in Fig. 12.

It will be understood that two sets of flexible cords, pulleys and weights may be used one for each end of the flexing bar.

Figures 13, 14:
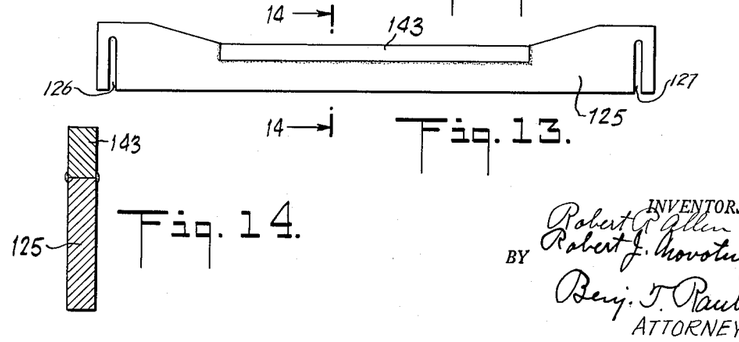
Fig. 13 is a detail view in perspective of the flexing bar and its connections.
Fig. 14 is a cross-section of the flexing bar of Fig. 13.

It is desirable to maintain the dimensions of the flexing bar exact so that the conditions of flexing may be at all times uniform. To prevent any variation the bar is provided with a wearing edge inset 143 of "carbaloy," tungsten carbide or similar hard, wear resistant, material as shown in Figs. 13 and 14 and brazed to the front edge of the abrasion bar 125, the bar being suitably recessed for this purpose to bring the wearing edge to a distance rearwardly of the bottoms of the recesses 126 and 127.

Figure 15:
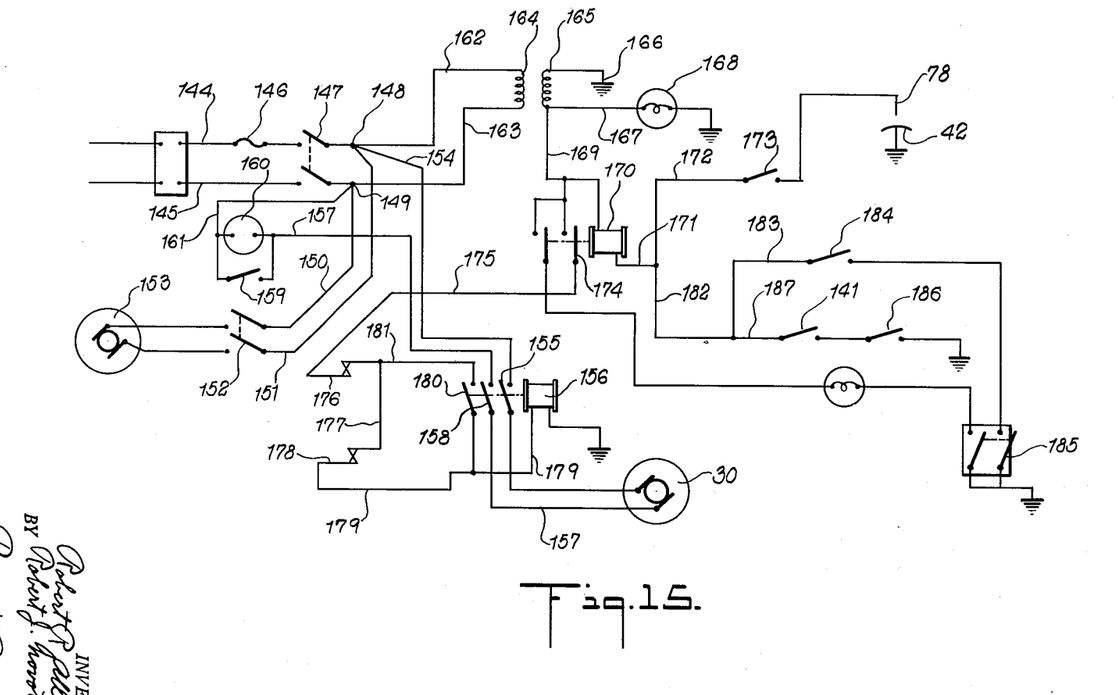
Fig. 15 is a wiring diagram showing the electrical connections of the apparatus.

In Fig. 15 is shown a diagram of electric wiring for the various controls for the above mechanism. As shown therein power is supplied through power mains 144 and 145 and fuse 146 to a control switch 147 and thence to terminals 148 and 149. From these terminals This page is largely illegible due to a large black obstruction covering the center of the page, making the text unreadable as continuous content.

base, a motor driven means to reciprocate said base on a horizontal plane, an electric circuit to stop said reciprocating means when said circuit is closed, a counter to count the reciprocations of said base, a hollow, flexible, resilient, fabric supporting dome on said base inflated by fluid pressure so that it can flatten under pressure, a weighted abrasion head bearing on the surface of said dome, a contact connected in said circuit in and fixed in position vertically relative to said base and a contact connected in said circuit and movable vertically with said abrasion head to contact with said fixed contact and close said circuit.

12. The fabric testing machine of claim 11 in which said contact movable vertically with said abrasion head is adjustable vertically relative to said abrasion head.

13. A fabric testing machine which comprises a base, a resilient, fabric supporting dome on said base, means to secure a fabric on said dome, an abrasion head bearing on said fabric and dome to flatten said dome, and means to move said base and fabric supporting dome horizontally relative to said abrasion head to and from a fixed position.

14. The fabric testing means of claim 13 in which said dome is a hollow, inflated dome of flexible material.

15. The fabric testing means of claim 13 having means to rotate said dome on a vertical axis.

16. The fabric testing machine of claim 13 having a dome supporting plate rotatably mounted on said base and having a fluid supply inlet to the upper face of the plate, means to rotate said plate on said base and in which said dome is a hollow, inflated dome of flexible material.

References Cited in the file of this patent

UNITED STATES PATENTS

| | | |
|---|---|---|
| 1,581,215 | Kobin | Apr. 20, 1926 |
| 1,762,164 | Eger | June 10, 1930 |
| 2,032,202 | Dennis | Feb. 25, 1936 |
| 2,100,332 | Hathaway et al. | Nov. 30, 1937 |
| 2,170,640 | Kenyon | Aug. 22, 1939 |
| 2,251,681 | Hathaway et al. | Aug. 5, 1941 |
| 2,457,276 | Ross | Dec. 28, 1948 |
| 2,565,949 | Clifford et al. | Aug. 28, 1951 |

FOREIGN PATENTS

| | | |
|---|---|---|
| 378,396 | Germany | July 16, 1923 |